United States Patent [19]
Tohmon et al.

[11] Patent Number: 5,659,558
[45] Date of Patent: Aug. 19, 1997

[54] SHORT-WAVELENGTH LASER ELEMENT DOPED WITH RARE EARTH IONS, OPTICAL AMPLIFIER DOPED WITH RARE EARTH IONS, AND WAVELENGTH CONVERTER DOPED WITH RARE EARTH IONS

[75] Inventors: Genji Tohmon; Jun Ohya, both of Osaka; Tomoaki Uno, Hyogo, all of Japan

[73] Assignee: Matsushita Electric Industrial Co., Ltd., Osaka, Japan

[21] Appl. No.: 610,884

[22] Filed: Mar. 5, 1996

[30] Foreign Application Priority Data

Mar. 6, 1995 [JP] Japan ................................ 7-045758

[51] Int. Cl.$^6$ ................................................. H01S 3/30
[52] U.S. Cl. .......................... 372/5; 372/6; 372/41; 372/70
[58] Field of Search ........................ 372/5, 6, 41, 39, 372/69, 70

[56] References Cited

U.S. PATENT DOCUMENTS

| | | | |
|---|---|---|---|
| 5,299,215 | 3/1994 | Thrash et al. | 372/41 |
| 5,381,433 | 1/1995 | Esterowitz et al. | 372/41 |
| 5,388,110 | 2/1995 | Snitzer | 372/6 |
| 5,488,624 | 1/1996 | Thrash et al. | 372/41 |

OTHER PUBLICATIONS

J.Y. Allain et al., "Blue Upconversion Fluorozirconate Fibre Laser", Electronics Letters, Feb. 1, 1990, pp. 166–167, vol. 26, No. 3, An Abstract of this reference can be found on p. 4 of the Specification.

S.G. Grubb et al., "CW Room–Temperature Blue Upconversion Fibre Laser" Electronics Letters, Jun. 18, 1992, pp. 1243–1244, vol. 28, No. 13. An Abstract of this reference can be found on p. 4 of the Specification.

*Primary Examiner*—Leon Scott, Jr.
*Attorney, Agent, or Firm*—McDermott, Will & Emery

[57] ABSTRACT

A first pumping beam at a wavelength of 1210 nm emitted from a first pumping source is focused by a first lens system on an optical fiber. A second pumping beam at a wavelength of 650 nm emitted from a second pumping source passes through a coupler and a second lens system and arrives at the optical fiber to be incident thereon. Tm ions with which a core portion of the optical fiber is doped sequentially experience a ground-state level absorption transition upon absorption of the first pumping beam, an excited-state level absorption transition to an upper laser level upon absorption of the second pumping beam, and a radiative transition from the upper laser level to a ground-state level, thereby emitting light at a wavelength of 460 to 500 nm. The light at a wavelength of 460 to 500 nm emitted from the Tm ions is resonated by a resonator consisting of an incident mirror and an emitting mirror and outputted as a laser beam.

23 Claims, 12 Drawing Sheets with rare earth ions, and a wavelength converter doped with rare earth ions, each for use in such fields as optical information processing, optical measurement, and environmental measurement.

SHORT-WAVELENGTH LASER ELEMENT DOPED WITH RARE EARTH IONS, OPTICAL AMPLIFIER DOPED WITH RARE EARTH IONS, AND WAVELENGTH CONVERTER DOPED WITH RARE EARTH IONS

BACKGROUND OF THE INVENTION

The present invention relates to a short-wavelength laser element doped with rare earth ions, an optical amplifier doped with rare earth ions, and a wavelength converter doped with rare earth ions, each for use in such fields as optical information processing, optical measurement, and environmental measurement.

Since the 1960s, vigorous research and development has been directed toward rare earth ions with which optical materials are to be doped and, as a result, there have been proposed laser elements doped with rare earth ions which have various arrangements and exhibit laser oscillation at different wavelengths.

In a typical laser element doped with rare earth ions, an optical material doped with rare earth ions is irradiated with light from a flash lamp so that the rare earth ions are excited from the ground state to a higher energy state. With the excitation, the energy level of the rare earth ions shifts from the ground-state level to an upper laser level. Between the upper laser level and a lower laser level is achieved a population inversion of the rare earth ions, resulting in emission of light at a specific wavelength. The emitted light is resonated by reflecting surfaces formed on both ends of the optical material and emitted as a laser beam from the optical material.

By such an excitation technique using the flash lamp, however, light in the higher wavelength region is radiated from the flash lamp so that the optical material is also irradiated with light at such wavelengths that cannot be absorbed by the rare earth ions, resulting in heat generation which adversely affects the optical material and reduces the efficiency with which the radiated light is converted to a laser beam due to a reduced amount of light absorbed by the optical material.

It was not until the 1980s that a solid-state laser, which oscillates in an absorption region specific to the rare earth ions, was used as a pumping source. As the output from a semiconductor laser element used as the pumping source for the solid-state laser is increased, laser elements doped with rare earth ions have been improved in output efficiency as well as reduced in size and price.

As a representative of the laser elements doped with rare earth ions to be excited by semiconductor lasers, there has been known a YAG (Yttrium-Aluminum-Garnet) laser element which uses an AlGaAs semiconductor laser oscillating at a wavelength of 809 nm as the pumping source and enables laser oscillation at a wavelength of 1064 nm. In principle, a conventional laser element doped with rare earth ions to be excited by a laser beam (laser-excited laser element) has been excited only with a laser beam having a wavelength longer than the wavelength of the pumping beam. To be more specific, rare earth ions having absorbed excitation energy are excited and promoted to a given energy level so that oscillation is primarily caused by a radiative transition from a higher energy level, which is lower than the given energy level.

However, there are some types of rare earth ions which exhibit so-called excited-state absorption (ESA) in which the rare earth ions in the higher energy level are excited again to experience a further transition to a still higher energy level because of the long fluorescence lifetime of the metastable energy level. Since the still higher energy level is higher than the energy level of each pumping beam, the laser oscillation is achieved at shorter wavelengths. A short-wavelength laser implemented by such excitation to the still higher energy level based on two-photon absorption is termed an upconversion laser.

As examples of the upconversion laser, there have currently been reported a laser doped with Ho or Er ions which is used as a source of green light at a wavelength of about 530 nm and a laser doped with Tm or Pr ions which is used as a blue light source. Such an upconversion laser requires two light beams at different wavelengths, since it involves primarily two absorption transitions. For example, as reported by Allain et al ("Blue Upconversion Fluorozirconate Fibre Laser," Electronics Letters, Vol. 26, p. 166), blue light at wavelengths of 450 to 480 nm oscillates in a laser element doped with Tm ions when the Tm ions sequentially experience a around-state absorption (GSA) transition and the ESA transition with a light beam at a wavelength of 680nm and with a light beam at a wavelength of 650 nm, respectively. In this case, however, since a Kr laser which is expensive and requires a large-scale element is used as a pumping source, its industrial applications are considerably limited.

There has also been reported an attempt by Grubb et al to obtain radiation of light at a wavelength of 480 nm by exciting Tm ions with light at three different wavelengths produced by a single pumping source ("Upconversion Blue Fiber Laser" Electronics Letters, Vol. 28, p. 1243, 1992).

FIG. 11 schematically shows the structure of a conventional short-wavelength laser element doped with rare earth ions to be excited by light at three wavelengths as a pumping source.

In the drawing are shown: a pumping-source laser element 800; a semiconductor laser element 801; a solid-state laser element 802 composed of a YAG crystal doped with Nd ions (hereinafter referred to as Nd:YAG solid-state laser element); first and second end mirrors 803 and 804 of the Nd:YAG solid-state laser element 802; a prism 805; a power source 806; a lens system 807; a fluoride-based optical fiber 808 doped with Tm ions; an incident mirror 809 of the optical fiber 808; an emitting mirror 810 of the optical fiber 808; a pumping beam 811 outputted from the pumping-source laser element 800; and a laser beam 812 at a wavelength of 480 nm emitted from the conventional short-wavelength laser element doped with rare earth ions.

In the conventional pumping-source laser element 800, light emitted from an array of about twenty AlGaAs-based semiconductor laser elements 801 irradiates the Nd:YAG solid-state laser element 802. The laser beam emitted from the Nd:YAG solid-state laser element 802 is divided by the prism 805 and only the laser beam in the 1100 nm wavelength region is reflected by the first end mirror 103 and returns to the Nd:YAG solid-state laser element 802. Thus, the first end mirror 103 and the second end mirror 104 constitute a resonator. The pumping-source laser element 800 emits the pumping beam 811 at a wavelength of about 1100 nm, which arrives at the optical fiber 808 to be incident thereon. The pumping beam 811 at a wavelength of about 1100 nm incident on the optical fiber 808 is absorbed by the Tm ions with which the optical fiber 808 has been doped.

FIG. 12 shows energy levels of the Tm ions in the conventional short-wavelength laser element doped with rare earth ions. Specifically, the drawing shows the energy levels of the Tm ions excited by the pumping beam 811 in the 1100 nm wavelength region. In the drawing, the vertical axis represents the energy level of the Tm ions in unit $cm^{-1}$ (Kayser). There are also shown: respective absorption transitions 852, 853, and 854; a radiative transition 855; and a non-radiative transition 856.

First, the Tm ions absorb the pumping beam and are thereby excited to undergo the GSA transition 852 from the ground-state level $^3H_6$ to the level $^3H_5$. Subsequently, the Tm ions in the level $^3H_5$ undergo the non-radiative transition 856 to the level $^3F_4$. The Tm ions in the level $^3F_4$ further absorb the pumping beam and are thereby excited to sequentially undergo the ESA transition 853 to the level $^3F_3$ and again the non-radiative transition 856 to the level $^3H_4$. The Tm ions in the level $^3H_4$ level further absorb the pumping beam and are thereby excited to undergo the ESA transition 854 to the level $^1G_4$, which is the upper laser level. The light emitted on the radiative transition 855 from the level $^1G_4$ to the ground-state level $^3H_6$ propagates the core of the optical fiber 808, resonated by the incident mirror 808 and emitting mirror 810 of the optical fiber 808, and then emitted as the laser beam 812 through the emitting mirror 810.

As an optical fiber amplifier doped with rare earth ions, there has been known one which primarily amplifies light at wavelengths for optical communication, i.e., wavelengths in the vicinity of 1300 nm or 1550 nm.

As a wavelength converter for converting the wavelength of light, there has been known one which has an optical waveguide for converting the wavelength of transmitted light to that of second harmonic light.

If upconversion is to be effected by a single pumping-source element, therefore, it is necessary to cause excitation with three pumping beams of light at three different wavelengths consisting of one pumping beam for the GSA and two pumping beams for the ESA and having overlapping absorption regions.

In the conventional short-wavelength laser element and optical amplifier each doped with rare earth ions, laser beams at three wavelengths of 1112 nm, 1116 nm, and 1123 nm are emitted from the pumping-source laser element 800 so as to effect one GSA transition and two ESA transitions in the Tm ions, thereby accomplishing upconversion.

However, if three absorption transitions are effected by the single pumping-source element, the efficiency with which the pumping beam causes laser oscillation is reduced.

Moreover, since the wavelengths of the three pumping beams are different from 1064 nm, which is the normal wavelength of the Nd:YAG solid-state laser, some adaptations are required to cause laser oscillation at the foregoing three wavelengths, which renders the pumping-source laser element complicated and bulky.

Furthermore, since the pumping-source laser element 800 has used the plurality of semiconductor lasers 801 therein, the short-wavelength laser element and optical amplifier each doped with rare earth ions are increased in scale, which restricts their industrial applications and increases their prices.

Although the Tm ions have been excited with the three pumping beams at the three wavelengths having overlapping absorption regions on one GSA transition and on two ESA transitions, their respective absorption coefficients are low in the overlapping absorption regions. Specifically, the peak wavelength on the GSA transition is in the vicinity of 1210 nm, whereas the peak wavelength on the second ESA transition (absorption transition from the level $^3F_4$ to the level $^1G_4$) is in the vicinity of 1150 nm. It follows that a difference of 60 nm or more exists between the two peak wavelengths and hence high pumping power is required disadvantageously to achieve an oscillation threshold, while the efficiency with which the pumping beam causes laser oscillation is low.

The semiconductor laser currently used cannot provide sufficient power required by the pumping beam in the 1100 nm wavelength region to effect efficient upconversion in the Tm ions, since the semiconductor laser currently used emits a laser beam in the 1200 nm wavelength region. Although it is possible to obtain the pumping beam at a wavelength of 1100 nm from a semiconductor laser of quantum-well structure, the quantum-well structure should have about 5% of distortion, which impairs the characteristic of a semiconductor laser used as the pumping source.

Although an upconversion laser using an optical fiber is designed such that a pumping beam propagates the interior of the optical fiber in a single mode, a laser beam propagates the interior of the optical fiber in a multimode since the wavelength of the laser beam is shorter than that of the pumping beam, which considerably increases a propagation loss in a high-order mode.

There has also been known a method which uses an optical fiber with a large numerical aperture in order to increase the power density of the pumping beam in the optical fiber. In the case of using an upconversion laser, however, the pumping beam is not used for upconversion efficiently if the mode of the pumping beam is considerably different from the mode of a signal beam.

In the wavelength converter having the optical waveguide for converting transmitted light to second harmonic light, some restrictions are placed on the relationship between the wavelength of the light prior to conversion and the wavelength of light after conversion, while the conversion efficiency is low.

SUMMARY OF THE INVENTION

In view of the foregoing, a first object of the present invention is to provide a short-wavelength laser element which uses a semiconductor laser to enable laser oscillation at a low threshold with high efficiency, a second object of the present invention is to provide an optical amplifier which uses a semiconductor laser to enable amplification with high efficiency, and a third object of the present invention is to provide a wavelength converter which enables conversion of inputted light to light at a wavelength of 480 nm with high efficiency.

To attain the above first object, a short-wavelength laser element doped with rare earth ions according to the present invention comprises: a first pumping source for outputting a first pumping beam at a wavelength of 1000 to 1300 nm; a second pumping source for outputting a second pumping beam at a wavelength of 625 to 820 nm; an optical material having an incident portion on which the above first pumping beam and the above second pumping beam are incident and an emitting portion from which a laser beam at a wavelength of 460 to 500 nm is emitted, the above optical material being doped with Tm ions at a concentration of 0.001% to 10% which sequentially experience a ground-state absorption transition upon absorption of the above first pumping beam, an excited-state absorption transition to an upper laser level upon absorption of the above second pumping beam, and a radiative transition from the upper laser level to a ground-state level so as to emit light at a wavelength of 460 to 500 nm; and a resonator for resonating the light at a wavelength of 460 to 500 nm emitted from the above Tm ions such that the laser beam oscillates.

In the short-wavelength laser element doped with rare earth ions according to the present invention, the Tm ions with which the optical material has been doped sequentially experience the GSA transition upon absorption of the first pumping beam at a wavelength of 1000 to 1300 nm, the ESA transition upon absorption of the second pumping beam at a wavelength of 625 to 820 nm, and the radiative transition from the upper laser level to the ground-state level so as to emit natural light at a wavelength of 460 to 500 nm. The natural light at a wavelength of 460 to 500 nm emitted from the Tm ions is resonated by a resonator to oscillate as a laser beam, so that laser oscillation can be achieved by a semiconductor laser light source at a low threshold with high efficiency.

In the above short-wavelength laser element, the first pumping beam outputted from the above first pumping source preferably has a wavelength of 1200 to 1220 nm and the second pumping beam outputted from the above second pumping source preferably has a wavelength of 625 to 660 nm.

With the arrangement, a semiconductor laser can be used as the pumping source so that the laser element can be reduced in size, while the first or second pumping beam is absorbed with improved efficiency.

In the above short-wavelength laser element, the above optical material is preferably an optical fiber having a core portion as a high-refraction region and a clad portion as a low-refraction region surrounding the above core portion, the above core portion being doped with the above Tm ions.

In the above short-wavelength laser element, the above optical metrical is preferably a fluoride-based material.

In the above short-wavelength laser element, the above first pumping source is preferably a Nd:YAG laser element to be excited by a semiconductor laser, a semiconductor laser element, or an optical-fiber laser element doped with Yb or Nd to be excited by a semiconductor laser.

In the above short-wavelength laser element, the above second pumping source is preferably a semiconductor laser element.

To attain the second object, an optical amplifier doped with rare earth ions according to the present invention comprises: a first pumping source for outputting a first pumping beam at a wavelength of 1000 to 1300 nm; a second pumping source for outputting a second pumping beam at a wavelength of 625 to 820 nm; and an optical material having an incident portion on which the above first pumping beam, the above second pumping beam, and signal light at a wavelength of 460 to 500 nm are incident and an emitting portion from which the signal light amplified is emitted, the above optical material being doped with Tm ions at a concentration of 0.001% to 10% which sequentially experience a ground-state absorption transition upon absorption of the above first pumping beam, an excited-state absorption transition to an upper laser level upon absorption of the above second pumping beam, and a radiative transition from the upper laser level to a ground-state level so as to give a gain to the signal light at a wavelength of 460 to 500 nm.

In the optical amplifier doped with rare earth ions according to the present invention, the Tm ions with which the optical material has been doped sequentially experience the GSA transition upon absorption of the first pumping beam at a wavelength of 1000 to 1300 nm, the ESA transition upon absorption of the second pumping beam at a wavelength of 625 to 820 nm, and the radiative transition from the upper laser level to the ground-state level so as to give a gain to the signal light at a wavelength of 460 to 500 nm. As a result, the signal light at a wavelength of 460 to 500 nm obtains a high gain to be outputted. Consequently, the optical amplifier achieves high-efficiency amplification of the signal light with the use of the semiconductor laser light source.

In the above optical amplifier, the first pumping beam outputted from the above first pumping source preferably has a wavelength of 1200 to 1220 nm and the second pumping beam outputted from the above second pumping source preferably has a wavelength of 625 to 660 nm.

With the arrangement, a semiconductor laser can be used as a pumping source so that the laser element can be reduced in size, while the first or second pumping beam is absorbed with improved efficiency.

In the above optical amplifier, the above optical material is preferably an optical fiber having a core portion as a high-refraction region and a clad portion as a low-refraction region surrounding the above core portion, the above core portion being doped with the above Tm ions.

In the above optical amplifier, the above optical metrical is preferably a fluoride-based material.

In the above optical amplifier, the above first pumping source is preferably a Nd:YAG laser element to be excited by a semiconductor laser, a semiconductor laser element, or an optical-fiber laser element doped with Yb or Nd to be excited by a semiconductor laser.

In the above optical amplifier, the above second pumping source is preferably a semiconductor laser element.

To attain the third object, a wavelength converter doped with rare earth ions according to the present invention comprises: a pumping source for outputting a pumping beam at a wavelength of 625 to 820 nm; and an optical material having an incident portion on which the above pumping beam and light to be subjected to wavelength conversion are incident and an emitting portion from which the above pumping beam or light at a wavelength of 460 to 500 nm is emitted, the above optical material being doped with Tm ions at a concentration of 0.001% to 10% which sequentially experience ground-state absorption transition upon absorption of the above light to be subjected to wavelength conversion, an excited-state absorption transition to an upper laser level upon absorption of the above pumping beam, and a radiative transition from the upper laser level to a ground-state level so as to emit the light at a wavelength of 460 to 500 nm.

In the wavelength converter doped with rare earth ions according to the present invention, the Tm ions with which the optical material has been doped sequentially experience, when light to be subjected to wavelength conversion is incident thereon, the GSA transition upon absorption of the incident light, the ESA transition upon absorption of the pumping beam at a wavelength of 625 to 820 nm, and the radiative transition from the upper laser level to the ground-state level so as to emit the light at a wavelength of 460 to 500 nm. As a result, the light at a wavelength of 460 to 500 nm is outputted from the wavelength converter. In other words, when infrared light is inputted, it is converted to blue light before outputted. Conversely, when the light to be subjected to wavelength conversion is not incident thereon, the Tm ions will absorb no light and hence will experience neither the GSA transition nor the ESA transition, so that the infrared light at a wavelength of 625 to 820 nm is outputted as it is.

In the above wavelength converter, the pumping beam outputted from the above pumping source preferably has a wavelength of 625 to 660 nm.

With the arrangement, a semiconductor laser can be used as a pumping source so that the wavelength converter can be reduced in size, while the pumping beam is absorbed with improved efficiency.

The above wavelength converter preferably further comprises a resonator for resonating the light at a wavelength of 460 to 500 nm emitted from the above Tm ions such that a laser beam oscillates.

With the arrangement, the natural light emitted from the Tm ions is resonated by the resonator so that a coherent laser beam at a wavelength of 480 nm can be outputted.

In the above wavelength converter, the above optical material is preferably an optical fiber having a core portion as a high-refraction region and a clad portion as a low-refraction region surrounding the above core portion, the above core portion being doped with the above Tm ions.

In the above wavelength converter, the above optical metrical is preferably a fluoride-based material.

In the above wavelength converter, the above pumping source is preferably a semiconductor laser element.

DETAILED DESCRIPTION OF THE INVENTION

Below, the principle of the present invention which is common to the individual embodiments of the present invention will be described before detailed descriptions will be given thereto with reference to the drawings.

The present invention has been achieved based on the finding of the fact that Tm ions with which an optical material is to be doped sequentially experience a ground-state absorption (GSA) transition with a pumping beam at a wavelength of 1000 to 1300 nm, particularly 1200 to 1220 nm, an excited-state absorption (ESA) transition to an upper laser level with a pumping beam at a wavelength of 625 to 820 nm, particularly 625 to 660 nm, and a radiative transition from the upper laser level to a ground-state level so as to emit light at a wavelength of 460 to 500 nm, particularly 480 nm.

Figure 1:
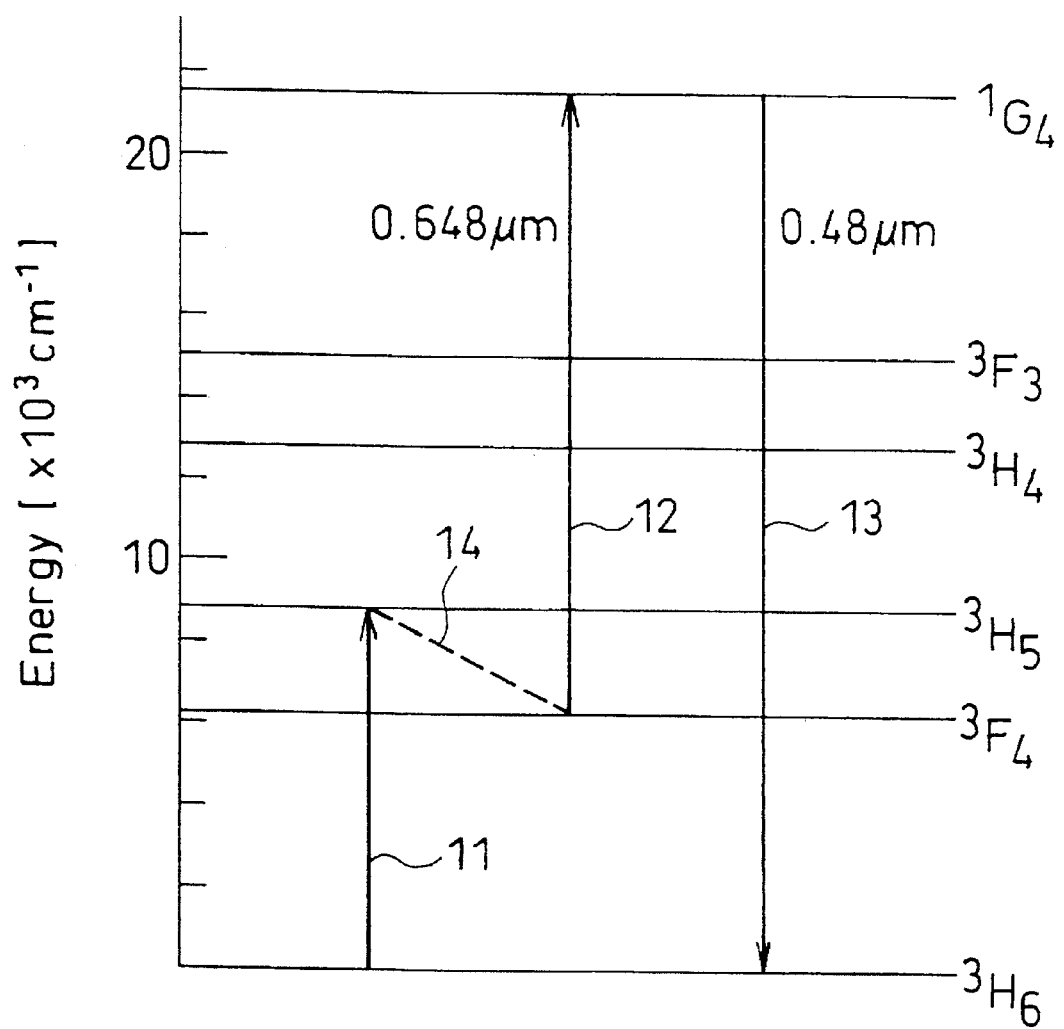
FIG. 1 shows transitions of energy levels of Tm ions with which an optical material has been doped.

FIG. 1 shows transitions of energy levels of the Tm ions, in which the vertical axis represents energy in unit $cm^{-1}$ (Kayser). In the drawing are shown: the GSA transition 11; the ESA transition 12; the radiative transition 13; and a non-radiative transition 14.

The Tm ions absorb the pumping beam at a wavelength of 1210 nm and are thereby excited to undergo the GSA transition 11 from the ground-state level $^3H_6$ to the level $^3H_5$. The Tm ions in the level $^3H_5$ then undergo the non-radiative transition to the level $^3F_4$. Thereafter the Tm ions in the level $^3F_4$ absorb the pumping beam at a wavelength of 650 nm and are thereby excited to undergo the ESA transition 12 to the upper laser level $^1G_4$. The Tm ions then undergo the non-radiative transition 13 from the upper laser level $^1G_4$ to the ground-state level $^3H_6$ so as to emit light at a wavelength of 480 nm.

Figure 8:
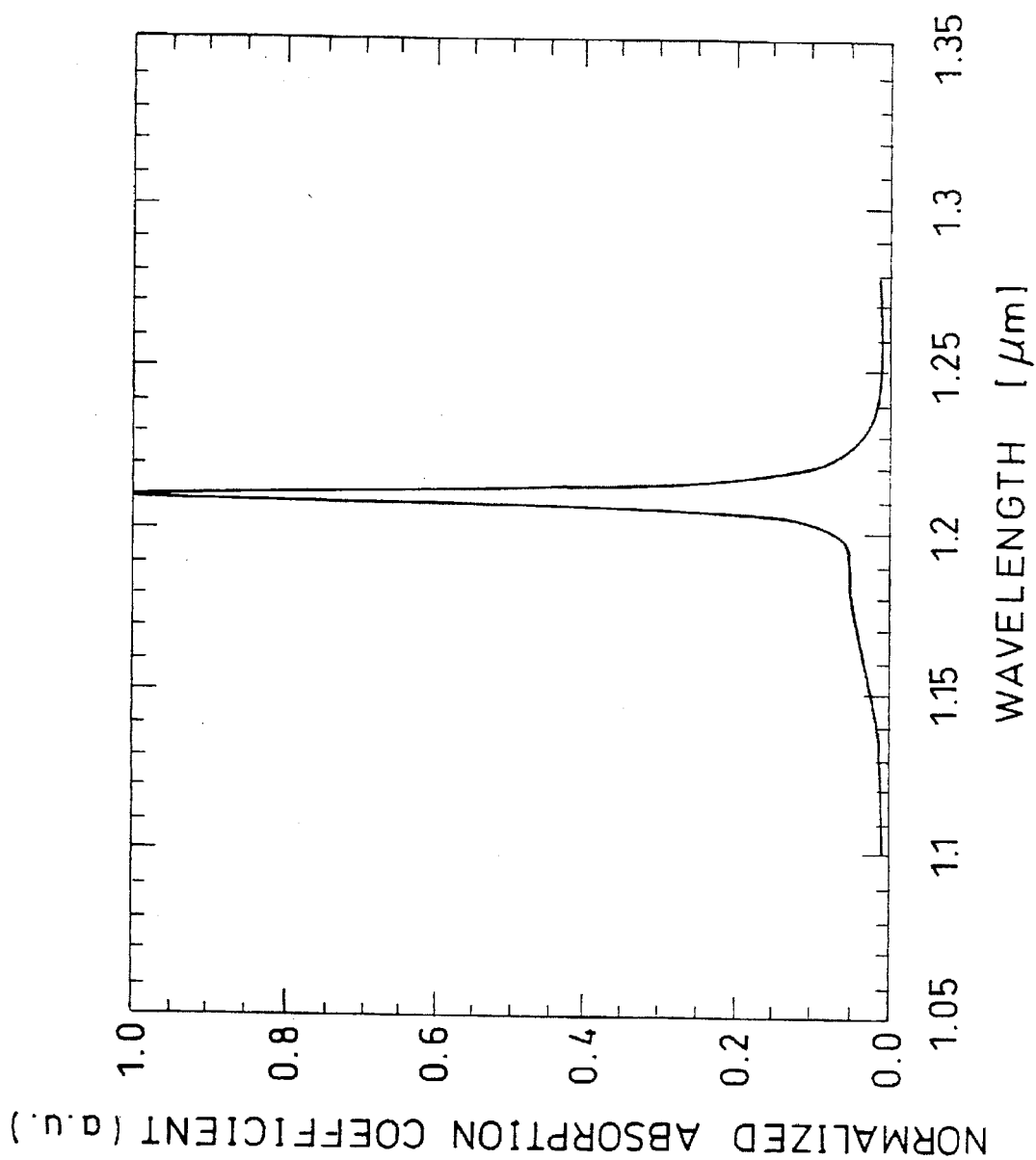
FIG. 8 shows an absorption cross section for the Tm ions with which the optical material has been doped on the GSA transition.

FIG. 8 shows an absorption cross section for Tm ions on the GSA transition from the ground-state level $^3H_6$ to an excited-state level $^3H_5$. In the drawing, the vertical axis is normalized to 1 as the peak value of the absorption cross section and the horizontal axis represents the wavelength of the light. As will be appreciated from FIG. 8, the GSA transition from the ground-state level $^3H_6$ to the excited-state level $^3H_5$ reaches the peak value in the vicinity of a wavelength of 1210 nm and the amount of absorbed light in the 1000 nm wavelength region conventionally used is equal to or lower than 1/10 of the maximum amount of absorbed light at a wavelength of 1210 nm.

Below, a description will be given to a short-wavelength laser element according to a first embodiment of the present invention (hereinafter simply referred to as short-wavelength laser element) with reference to FIG. 2.

Figure 2:
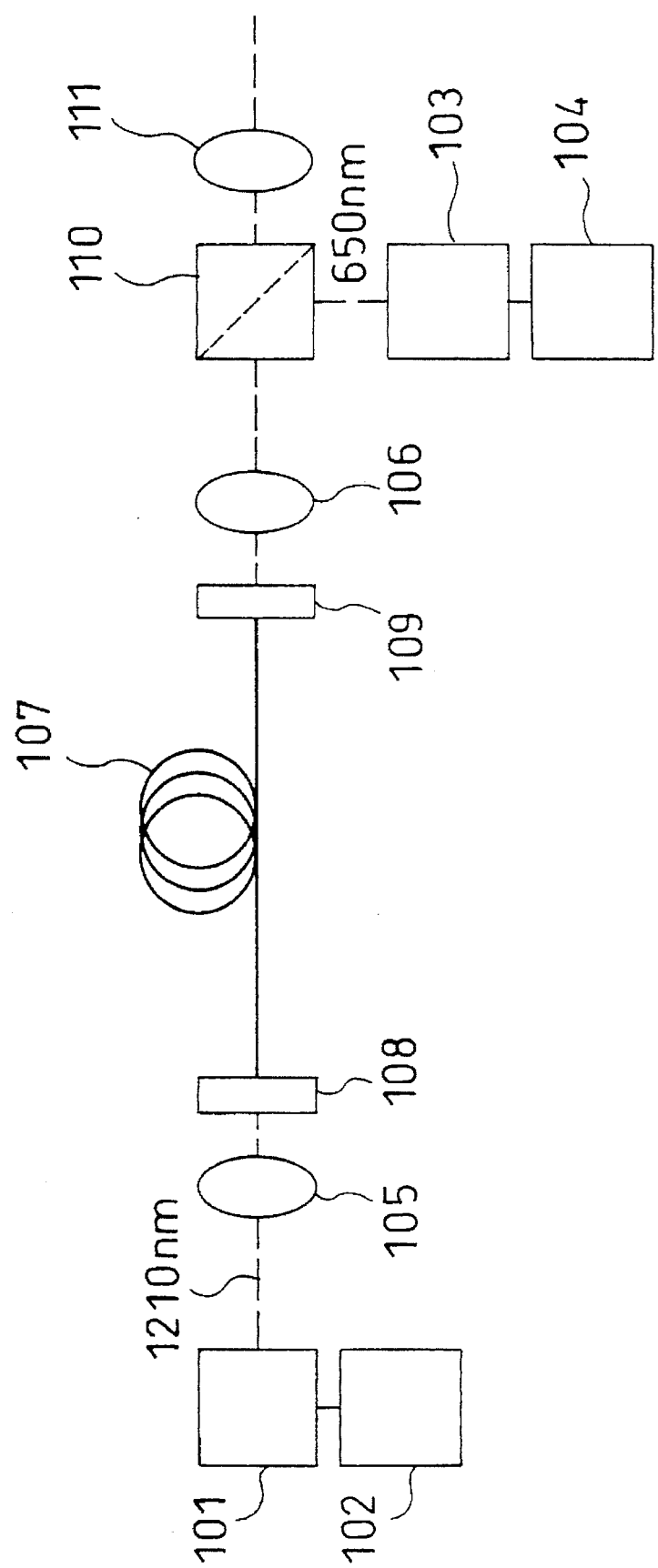
FIG. 2 schematically shows the structure of a short-wavelength laser element doped with rare earth ions according to a first embodiment of the present invention.

In FIG. 2 are shown: a first semiconductor laser element 101 for outputting a first pumping beam at a wavelength of 1210 nm; a power source and circuitry 102 for driving the first semiconductor laser element 101; a second semiconductor laser element 103 for outputting a second pumping beam at a wavelength of 650 nm; a power source and circuity 104 for driving the second semiconductor laser element 103; a first lens system 105; a second lens system 108; a fluoride-based optical fiber 107 having a core portion doped with Tm ions at a concentration of 1,000 p.p.m. ($^{1,000}/_{1,000,000}$ per unit volume). The core portion of the optical fiber 107 has a diameter of 3 μm and a length of 2 m. In the drawing are also shown: an incident mirror 108 provided at the incident portion of the optical fiber 107; an emitting mirror 109 provided at the emitting portion of the optical fiber 107; and a coupler 110.

The first pumping beam outputted from the first semiconductor laser element 101 is focused by the first lens system 105 on the optical fiber 107. The second pumping beam outputted from the second semiconductor laser element 103 passes through the coupler 110 and is focused by the second lens system 106 on the emitting portion of the optical fiber 107. The coupler 110 has the function of guiding the second pumping beam outputted from the second semiconductor laser 103 to the optical fiber 107 as well as guiding the light at a wavelength of 480 nm outputted from the optical fiber 107 to the output portion of the short-wavelength laser element, which has been provided with a third lens system 111.

The first pumping beam outputted from the first semiconductor laser element 101 and the second pumping beam outputted from the second semiconductor laser element 103 are absorbed by the Tm ions in accordance with the principle described above and the Tm ions emit natural light at a wavelength of 480 nm through the radiative transition. The incident mirror 108 of the optical fiber 107 is formed with a film exhibiting a high reflectance (>99%) with respect to the light at a wavelength of 480 nm, while the emitting mirror 109 of the optical fiber 107 is formed with a film exhibiting a reflectance of 50% to 95% with respect to the light at a wavelength of 480 nm. The incident mirror 108 and the emitting mirror 109 constitute a resonator. The light at a wavelength of 480 nm outputted from the Tm ions is emitted as a laser beam through the emitting mirror 109 of the optical fiber 107, passes through the coupler 110, and is outputted from the output portion of the short-wavelength laser element.

Figure 3:
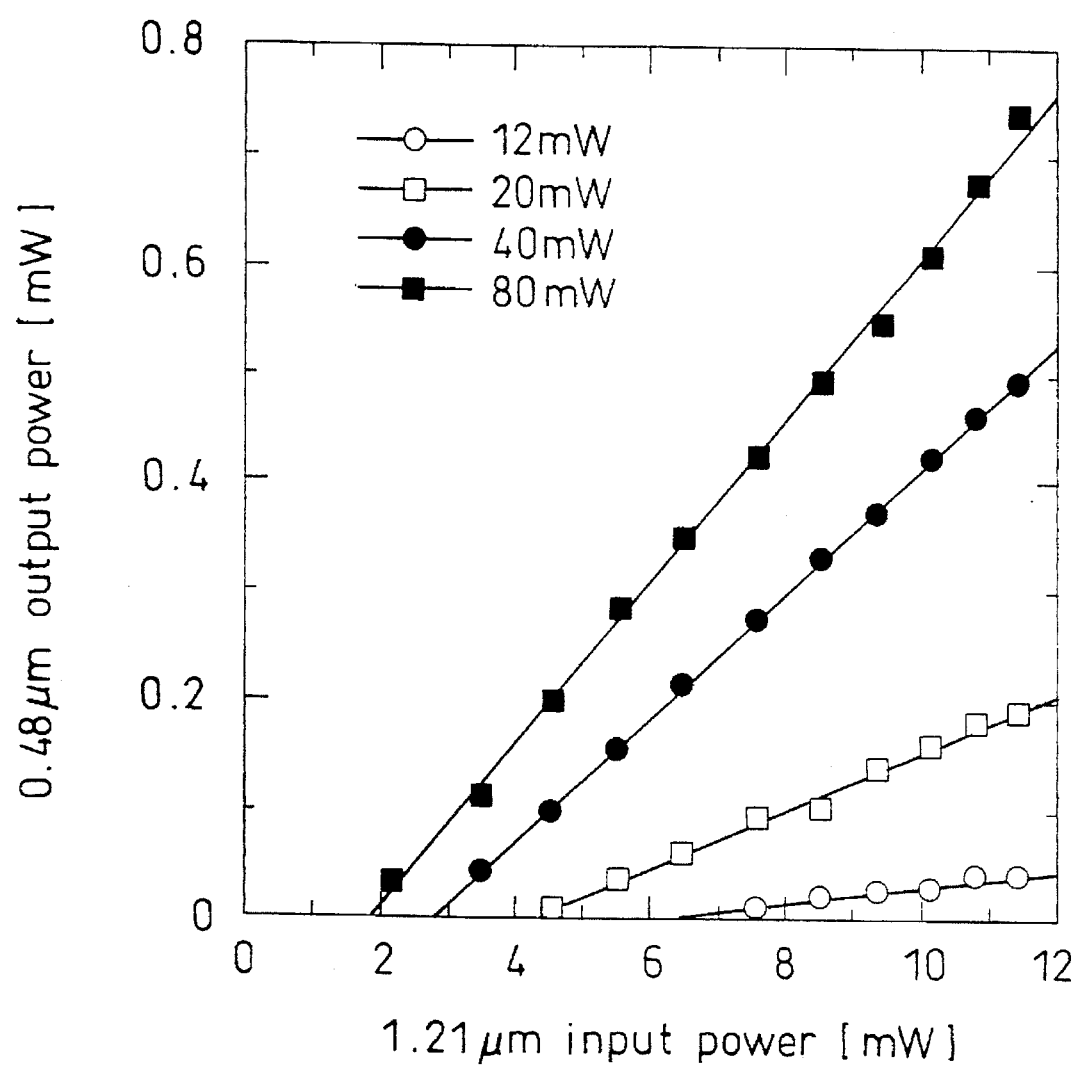
FIG. 3 shows a first output characteristic of a laser beam at a wavelength of 480 nm outputted from the short-wavelength laser element doped with rare earth ions according to the above first embodiment.

FIG. 3 shows the output characteristic of the laser beam at a wavelength of 480 nm outputted from the short-wavelength laser element according to the first embodiment. In the drawing, the vertical axis represents the intensity of the outputted laser beam at a wavelength of 480 nm and the horizontal axis represents the input intensity of the first pumping beam at a wavelength of 1210 nm outputted from the first semiconductor laser element 101. In FIG. 3, the intensity of the second pumping beam at a wavelength of 650 nm outputted from the second semiconductor laser element 103 is shown as a parameter.

As will be appreciated from FIG. 3, the oscillation threshold value was obtained with an extremely low input value. In the conventional short-wavelength laser element, the oscillation threshold for the laser beam at a wavelength of 480 nm was obtained when the input power of the pumping beam at a wavelength of 1100 nm was 30 mW. In contrast, the oscillation threshold was obtained in the first embodiment when the input power of the first pumping beam at a wavelength of 1210 nm was 2 mW, as shown in FIG. 3.

Figure 9:
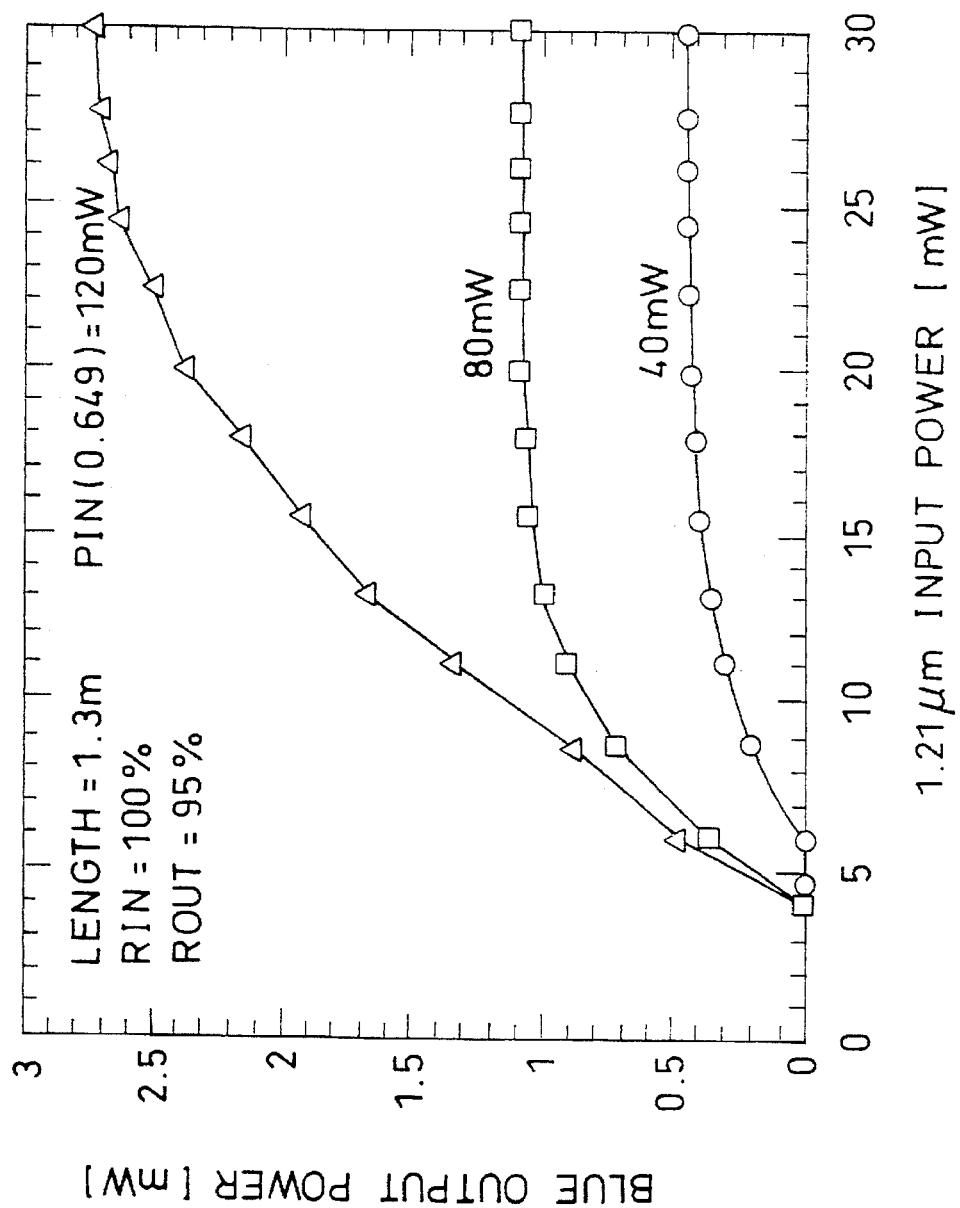
FIG. 9 shows a second output characteristic of the laser beam at a wavelength of 480 nm outputted from the short-wavelength laser element according to the above first embodiment.

FIG. 9 shows the output characteristic of the laser beam at a wavelength of 480 nm outputted from a short-wavelength laser element having substantially the same structure as the first embodiment. In FIG. 9 also, the intensity of the second pumping beam at a wavelength of 650 nm outputted from the second semiconductor laser element 103 is shown as a parameter, similarly to FIG. 3. The short-wavelength laser element has the same structure as the first embodiment except that the optical fiber has a length of 1.3 μm and that the amount of input for excitation is larger in FIG. 9 than in FIG. 3.

As will be appreciated from FIG. 9, the power of the output beam at a wavelength of 480 nm is 2.8 mW when the input power of the first pumping beam at a wavelength of 1210 nm is 30 mW and the input power of the second pumping beam is 120 mW, which provides a sufficiently usable output in the industrial applications of the short-wavelength laser element.

Figure 10:
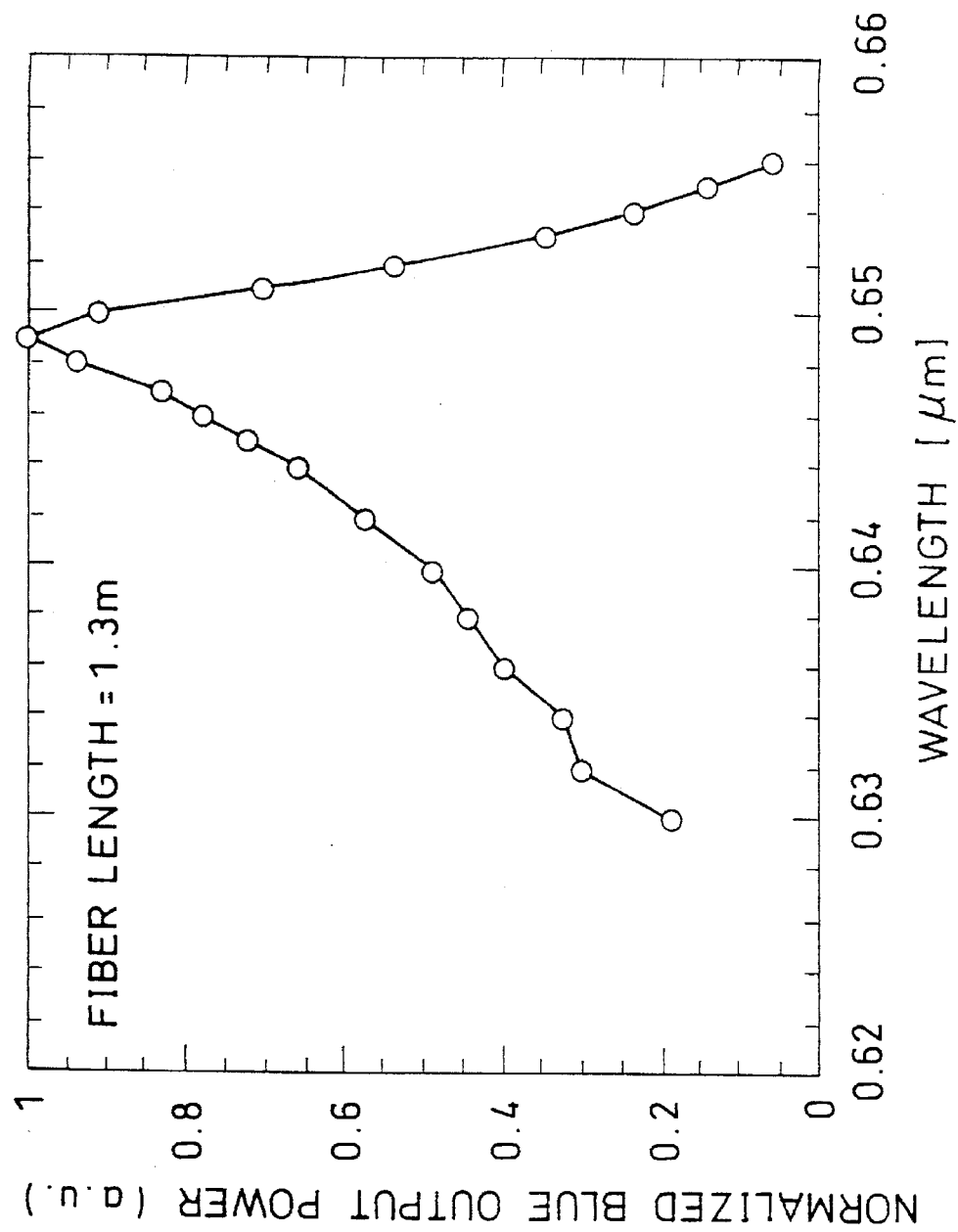
FIG. 10 shows the dependence of the power of output light at a wavelength of 480 nm from the short-wavelength laser element doped with rare earth ions according to the above first embodiment on the wavelength of a pumping beam in the 650 nm wavelength region.
Figure 11:
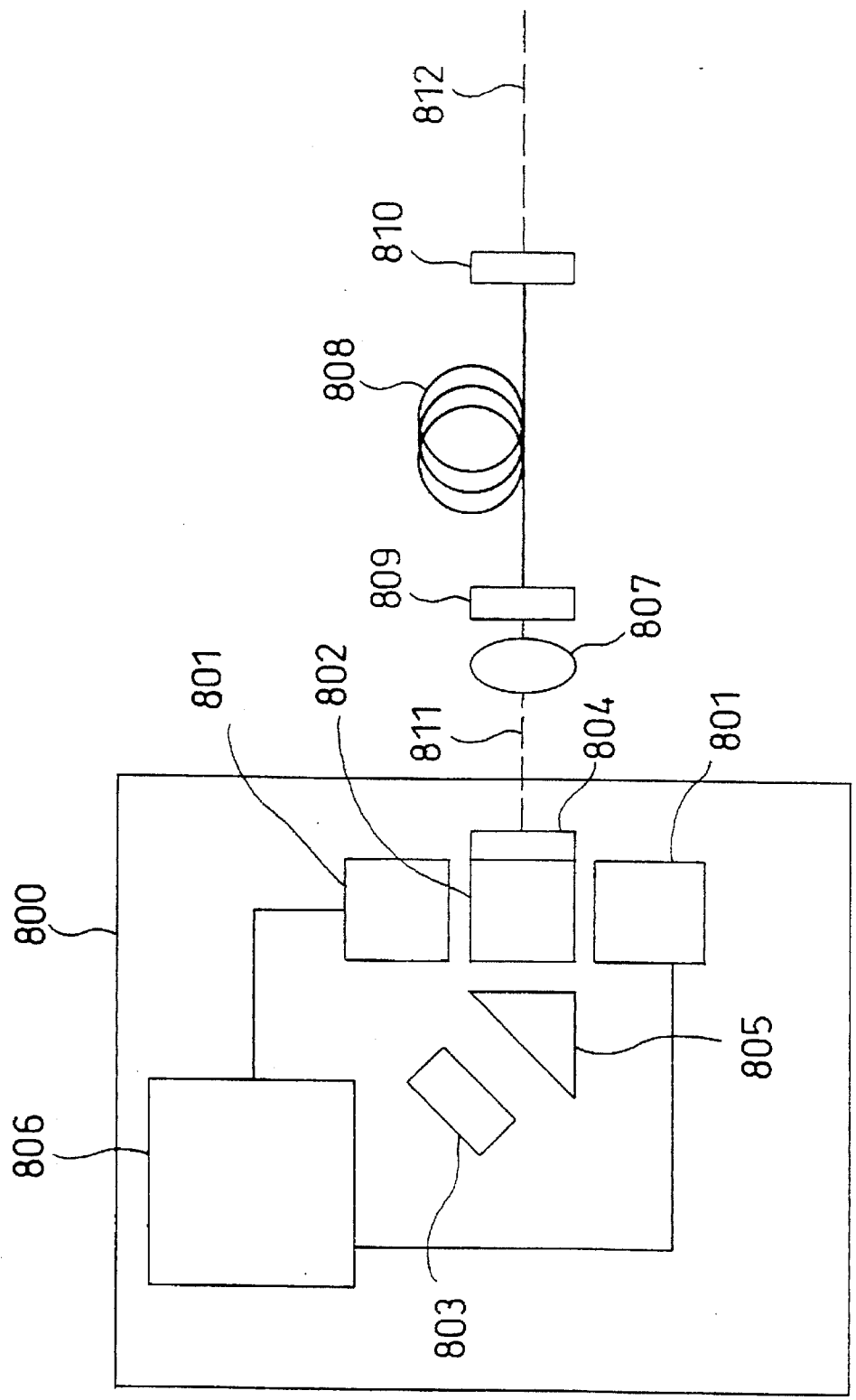
FIG. 11 schematically shows the structure of a conventional short-wavelength laser element doped with rare earth ions.
Figure 12:
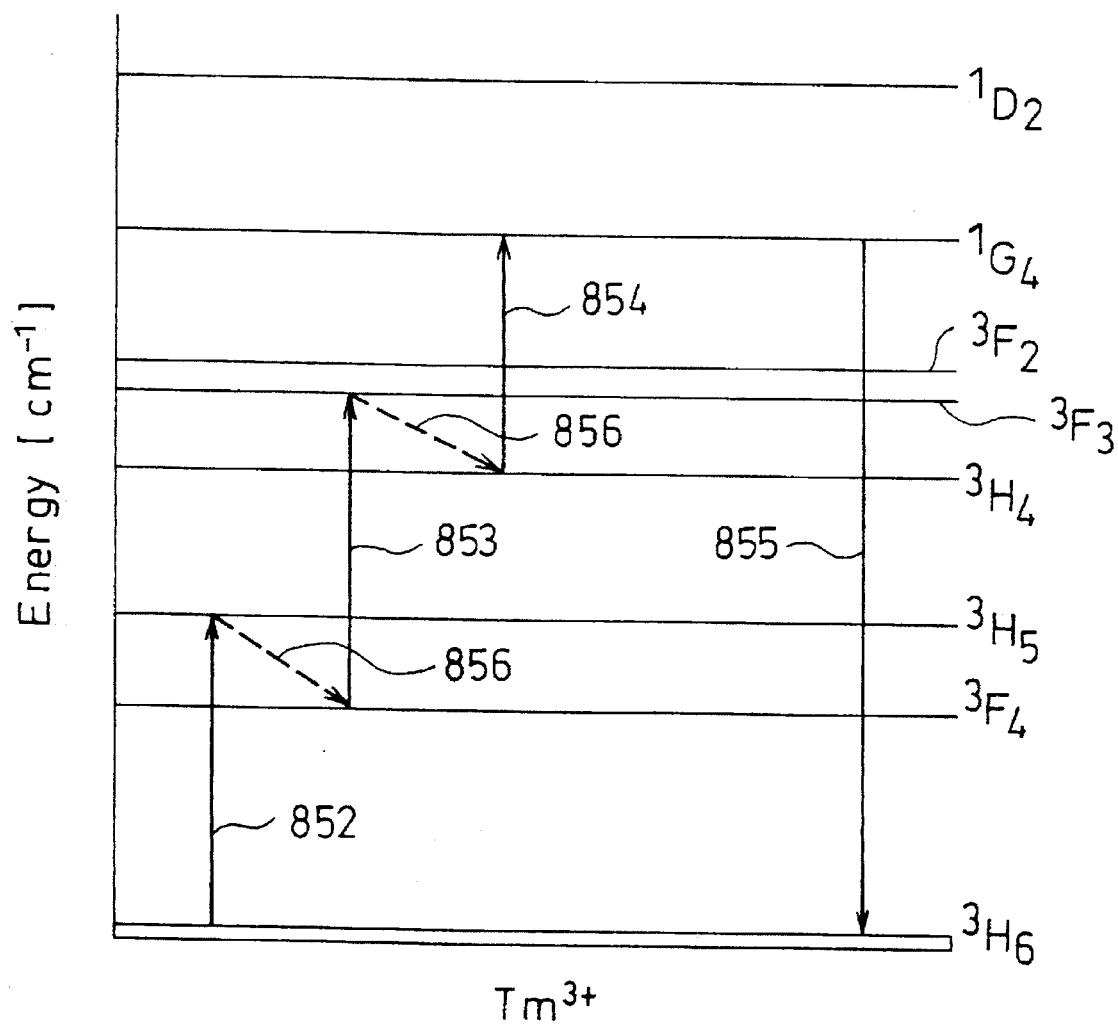
FIG. 12 shows the energy levels of Tm ions in the conventional short-wavelength laser element doped with rare earth ions.

FIG. 10 shows the dependence of the power of the output beam at a wavelength of 480 nm on the wavelength of the pumping beam in the 650 nm wavelength region. In the drawing, the vertical axis represents the output beam at a wavelength of 480 nm which is normalized to 1 as the peak value and the horizontal axis represents the wavelength of the second pumping beam in the 650 nm wavelength region. As will be appreciated from FIG. 10, the output beam at a wavelength of 480 nm reaches the peak value when the wavelength of the second pumping beam is 649 nm.

Although a conventional embodiment should use a large-scale solid-state laser element as a pumping source, the first embodiment provides a remarkably compact short-wavelength laser element excellent in manufactuability since oscillation is accomplished by a compact, low-power, and long-life semiconductor laser element.

Below, an optical amplifier doped with rare earth ions according to a second embodiment of the present invention (hereinafter simply referred to as optical amplifier) will be described with reference to FIG. 4.

Figure 4:
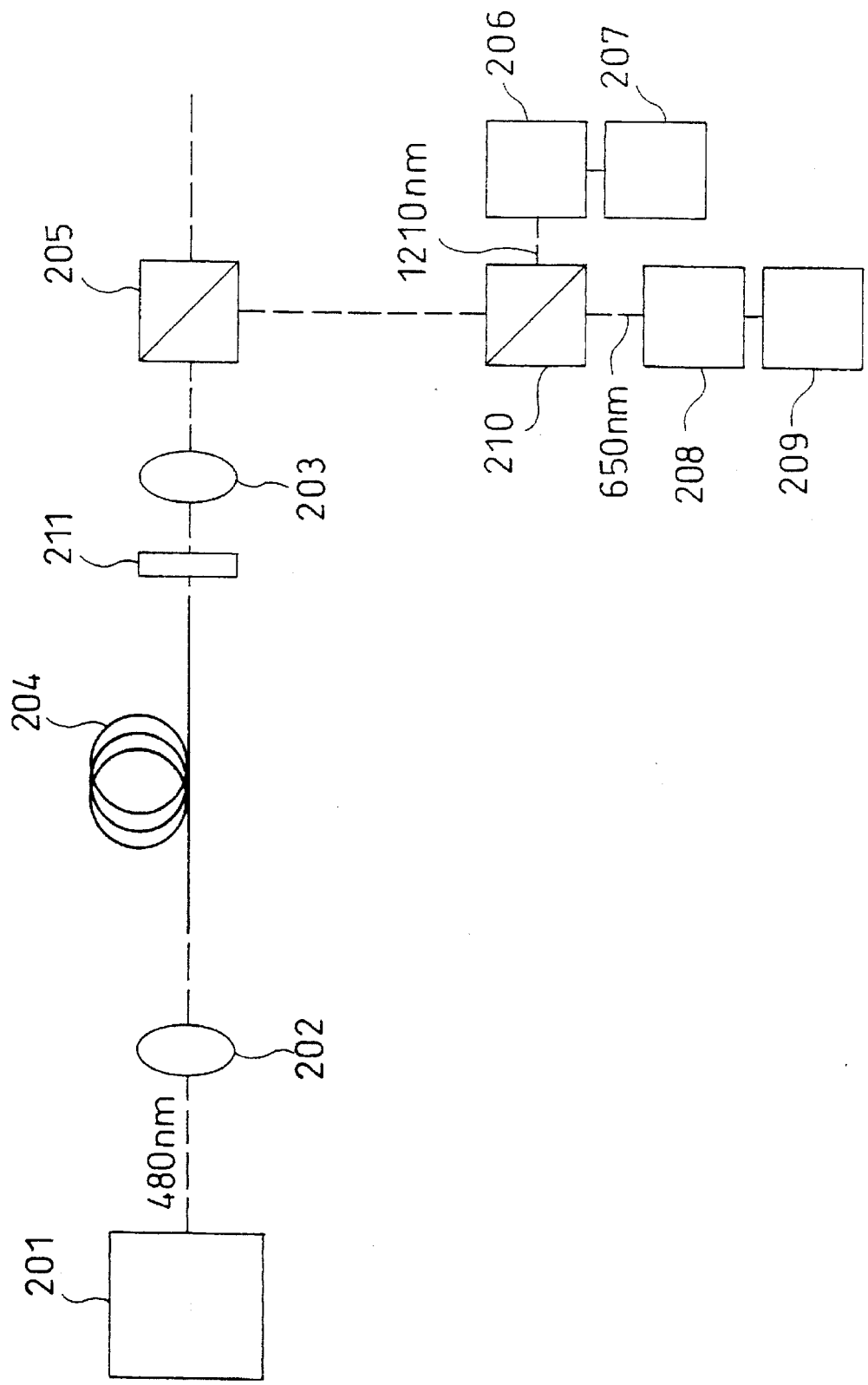
FIG. 4 schematically shows the structure of an optical amplifier doped with rare earth ions according to a second embodiment of the present invention.

In FIG. 4 are shown: a signal source 201 for outputting signal light at a wavelength of 480 nm; a first lens system 202; a second lens system 203; a fluoride-based optical fiber 204 having a core portion doped with Tm ions at a concentration of 1000 p.p.m.; a coupler 205; a first semiconductor laser element 206 for outputting a first pumping beam at a wavelength of 1210 nm; a power source and circuitry 207 for driving the first semiconductor laser element 206; a second semiconductor laser element 208 element for outputting a second pumping beam at a wavelength of 650 nm; a power source and circuitry 209 for driving the second semiconductor laser element 208; and a coupler 210.

The signal light at a wavelength of 480 nm outputted from the signal source 201 is focused by the first lens system 202 on the optical fiber 204. The first pumping beam outputted from the first semiconductor laser element 206 and the second pumping beam outputted from the second semiconductor laser element 208 are absorbed by the Tm ions with which the core portion of the optical fiber 204 has been doped. The signal light at a wavelength of 480 nm outputted from the signal source 201 obtains a gain from the Tm ions on the radiative transition from the upper laser level $^1G_4$ from the ground-state level $^3H_6$, is amplified thereby, and is outputted through the coupler 205.

The second embodiment is different from the first embodiment in that an optical isolator 211 is provided between the emitting portion of the optical fiber 204 and the second lens system 203, instead of the incident and emitting mirrors provided on both ends of the optical fiber 204 in the first embodiment. Although the Tm ions achieves a population inversion between the upper laser level and the ground-state level, the absence of the resonator and the presence of the isolator 211 suppresses the resonance of the natural light emitted from the Tm ions, so that laser oscillation is not observed.

Below, a description will be given to the characteristic and performance of the optical amplifier according to the second embodiment.

The characteristic of the optical amplifier according to the second embodiment was examined by varying the input intensity of the first pumping beam outputted from the first semiconductor laser element 206 in the range of 0 to 100 mW and by varying the input intensity of the second pumping beam outputted from the second semiconductor laser element 208 in the range of 0 to 200 mW. In the case where the input intensity of the signal light was as low as −30 dBm, an amplification factor of 20 dB and an output intensity of 10 dB were obtained, while the 3-dBm compression value of the signal light was 18 dBm. The amplification factor for the first pumping beam at a wavelength of 1200 nm, i.e., excitation efficiency was 0.2 dB/mW, which was extremely high.

Below, a wavelength converter doped with rare earth ions (hereinafter referred to as wavelength converter) according to a third embodiment of the present invention will be described with reference to FIG. 5.

Figure 5:
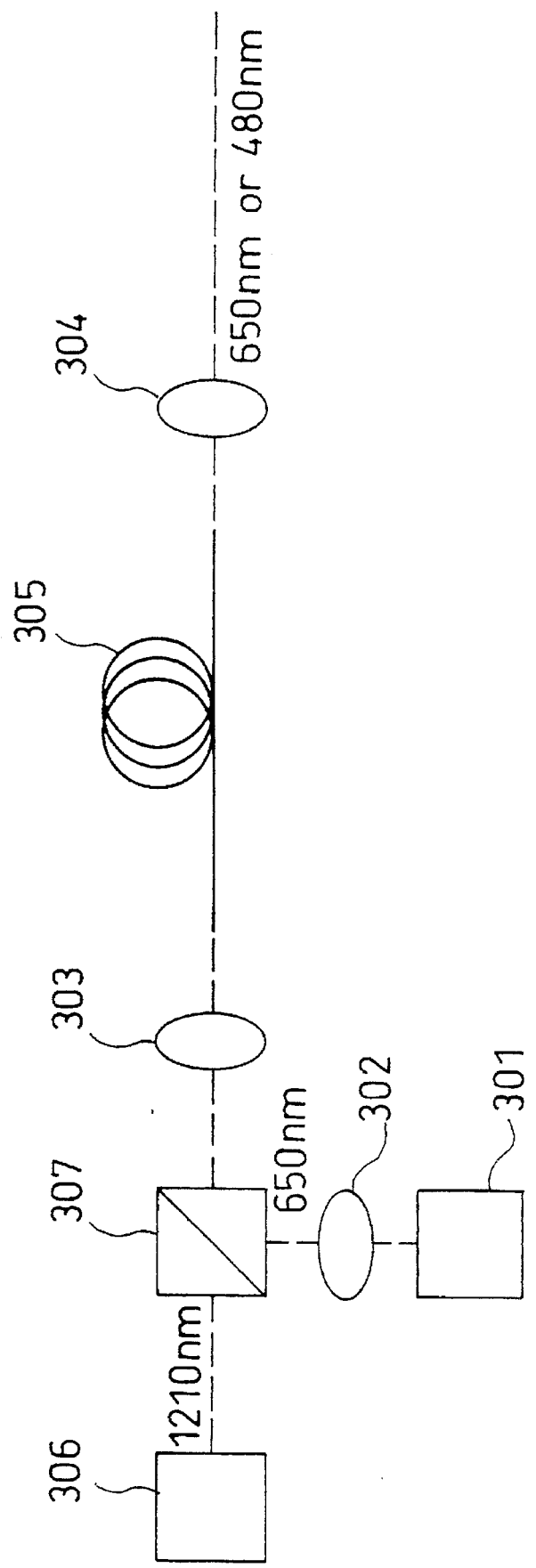
FIG. 5 schematically shows the structure of a wavelength converter doped with rare earth ions according to a third embodiment of the present invention.

In FIG. 5 are shown: a semiconductor laser element 301 for outputting a pumping beam at a wavelength of 650 nm; first, second, and third lens systems 302, 303, and 304; a fluoride-based optical fiber 305 having a core portion doped with Tm ions at a concentration of 1000 p.p.m.; a signal source 306 for outputting light at a wavelength of 1210 nm; and a coupler 307.

The pumping beam at a wavelength of 650 nm outputted from the semiconductor laser element 301 passes sequentially through the first lens system 302 and coupler 307 and is focused by the second lens system 303 on the optical fiber 305.

When the light at a wavelength of 1210 nm is not outputted from the signal source 306, the Tm ions with which the core portion of the optical fiber 305 has been doped does not undergo the GSA transition, so that the pumping beam at a wavelength of 650 nm outputted from the semiconductor laser element 301 is not absorbed by the Tm ions but is outputted as it is through the third lens system 304.

On the other hand, when the light at a wavelength of 1210 nm is outputted from the signal source 306, the Tm ions with which the core portion of the optical fiber 305 has been doped absorb the light at a wavelength of 1210 nm in accordance with the principle described above so as to undergo the GSA transition. Subsequently, the Tm ions absorb the pumping beam at a wavelength of 650 nm to undergo the ESA transition and then undergo the radiative transition from the upper laser level to the ground-state level, while emitting natural light at a wavelength of 480 nm on the radiative transition.

In other words, when the light at a wavelength of 1210 nm is not outputted from the signal source 306, the pumping beam at a wavelength of 650 nm is outputted as it is from the output portion of the wavelength converter. Conversely, when the light at a wavelength of 1210 nm is outputted from the signal source 306, the light at a wavelength of 480 nm is outputted from the wavelength converter. In short, the light at a wavelength of 1210 nm is converted to the light at a wavelength of 480 nm. In this case, the efficiency with which the light at a wavelength of 1210 nm is converted to the light at a wavelength of 480 nm is remarkably high. The conversion efficiency is dependent on the intensity of the pumping beam at a wavelength of 650 nm. In the case where the input power of the pumping beam at a wavelength of 650 nm was 100 mW, the output intensity of the light at a wavelength of 480 nm was 0.4 mW when the intensity of the inputted light at a wavelength of 1210 nm was 1 mW, so that a conversion efficiency of 40% was obtained.

Figure 6:
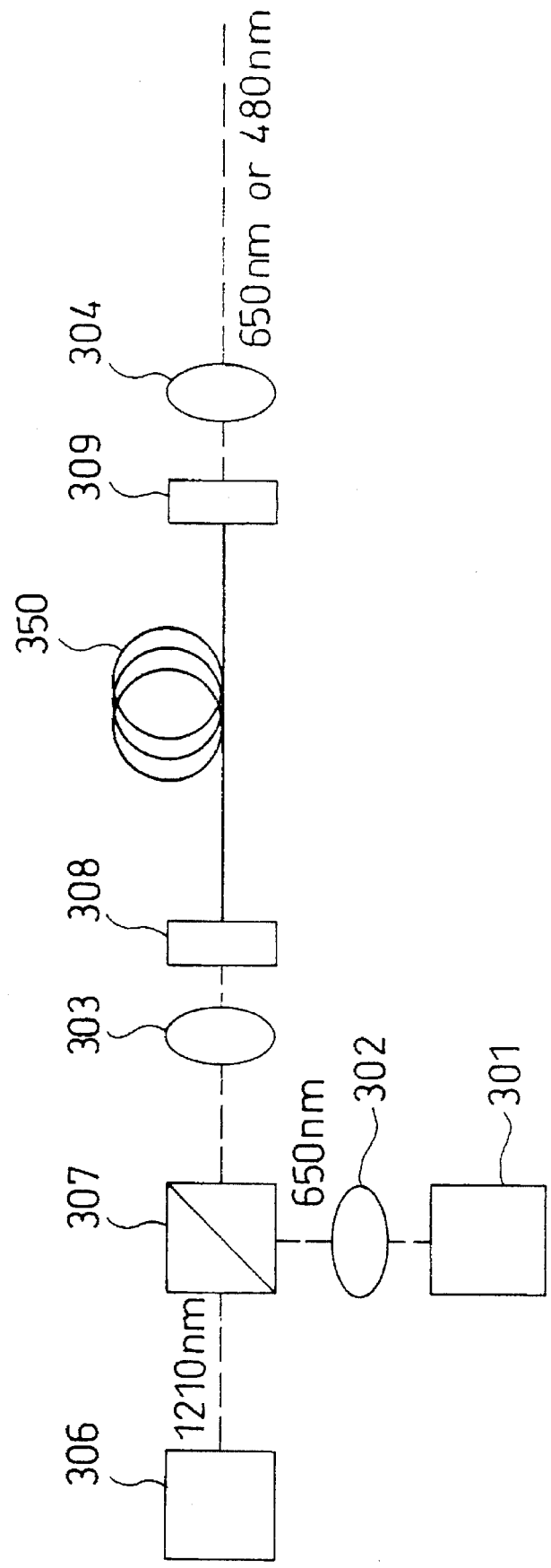
FIG. 6 schematically shows the structure of a wavelength converter doped with rare earth ions according to a fourth embodiment of the present invention.

Below, a wavelength converter doped with rare earth ions according to a fourth embodiment of the present invention will be described with reference to FIG. 6.

In the fourth embodiment, the description will be given especially to components different from those used in the third embodiment. As for the same components as used in the third embodiment, the description thereof will be omitted by providing the same reference numerals.

The fourth embodiment is characterized in that the incident and emitting portions of the optical fiber 305 are provided with respective incident and emitting mirrors 308 and 309. The incident mirror 308 is formed with a film exhibiting a high reflectance with respect to the light at 480 nm, while the emitting mirror 309 is formed with a film exhibiting a low reflectance with respect to the light at 480 nm.

In the fourth embodiment also, when the light at a wavelength of 1210 nm is not outputted from the signal source 306, the pumping beam at a wavelength of 650 nm is outputted as it is from the output portion of the wavelength converter, whereas the light at a wavelength of 480 nm is outputted from the output portion of the wavelength converter when the light at a wavelength of 1210 nm is outputted from the signal source 306, similarly to the third embodiment. However, since both ends of the optical fiber 305 are provided with the incident and emitting mirrors 308 and 309 which constitute a resonator, the natural light emitted from the Tm ions is resonated by the resonator, so that a coherent laser beam at a wavelength of 480 nm is outputted from the output portion of the wavelength converter. It is to be noted that the light outputted from the output portion of the wavelength converter is spontaneously emitted light at a wavelength of 480 nm.

The characteristics of the wavelength converters of the third and fourth embodiments, such as the oscillation threshold, are determined by the wavelength and intensity of the light outputted from the signal source 306 and by the wavelength and intensity of the pumping beam outputted from the semiconductor laser element 301.

Figure 7:
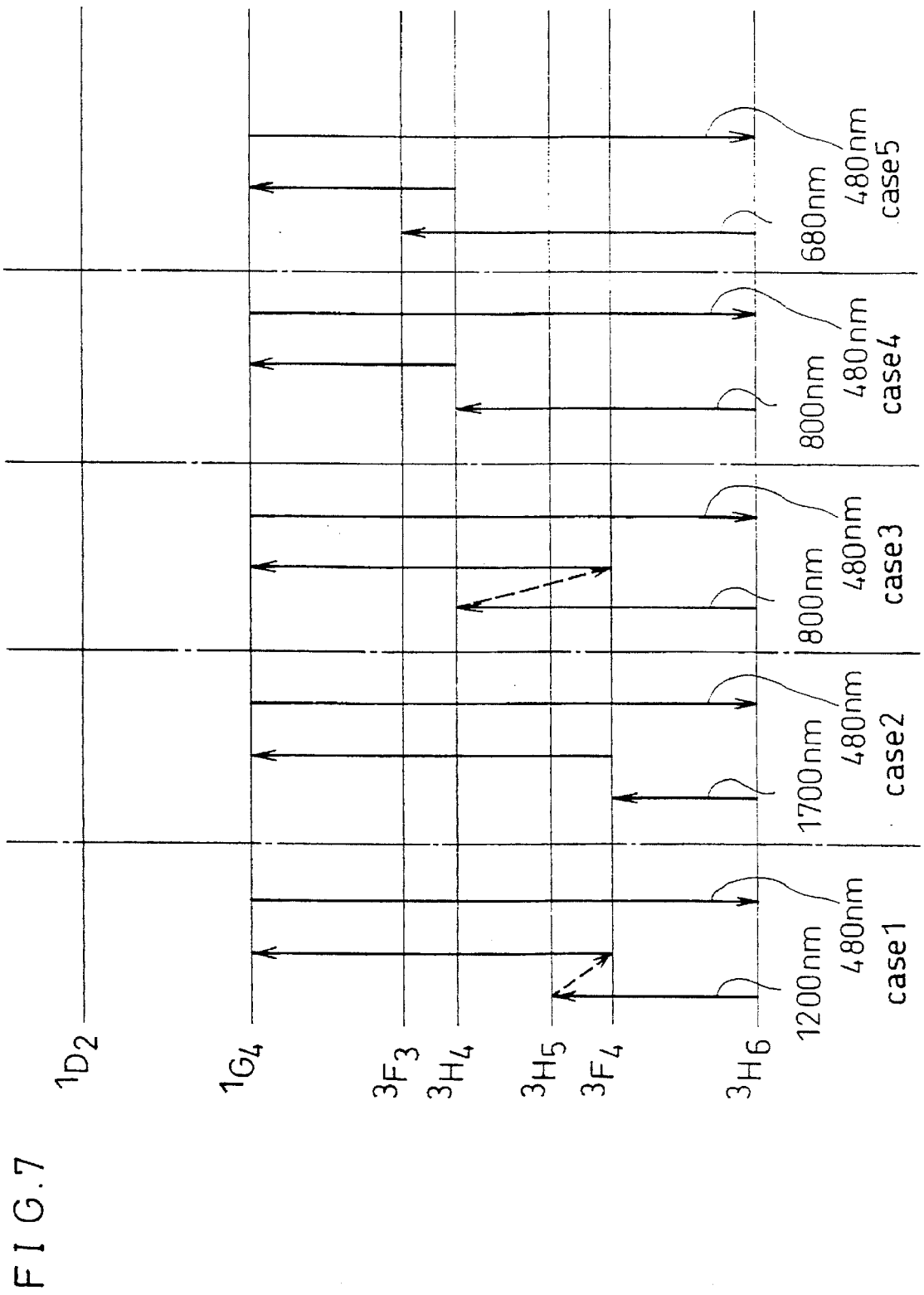
FIG. 7 shows transitions of energy levels of Tm ions in the case where the wavelength of light outputted from a signal source is varied in the wavelength converters doped with rare earth ions according to the third and fourth embodiments of the present invention.

FIG. 7 shows transitions of the energy levels of Tm ions when the wavelength of the light outputted from the signal source 306 is varied in each of the wavelength converters according to the third and fourth embodiments. In the case 1, when light at a wavelength of 1200 nm is inputted, the Tm ions sequentially undergo the GSA transition from the level $^3H_6$ to the level $^3H_5$, the non-radiative transition, the ESA transition from the $^3F_4$ level to the $^1G_4$ level and the radiative transition so as to output light at a wavelength of 480 nm. In the case 2, when light at a wavelength of 1700 nm is inputted, the Tm ions sequentially undergo the GSA transition from the level $^3H_6$ to the level $^3F_4$, the ESA transition from the level $^3F_4$ to the level $^1G_4$, and the radiative transition so as to output light at a wavelength of 480 nm. In the case 3, when light at a wavelength of 800 nm is inputted, the Tm ions sequentially Undergo the GSA transition from the level $^3H_6$ to the level $^3H_4$, the non-radiative transition, the ESA transition from the level $^3F_4$ to the level $^1G_4$, and the radiative transition so as to output light at a wavelength of 480 nm. In the case 4, when light at a wavelength of 800 nm is inputted, the Tm ions sequentially undergo the GSA transition from the level $^3H_6$ to the level $^3H_4$, the ESA transition from the level $^3H_4$ to the level $^1G_4$, and the radiative transition so as to output light at the wavelength of 480 nm. In the case 5, when light at a wavelength of 680 nm is inputted, the Tm ions sequentially undergo the GSA transition from the level $^3H_6$ to the level $^3F_3$, the non-radiative transition, the ESA transition from the level $^3H_4$ to the level $^1G_4$, and the radiative transition so as to output light at a wavelength of 480 nm.

Since the first to fourth embodiments have used the fluoride-based optical fiber as the optical material that can be doped with the Tm ions, the optical material is not limited thereto. Instead, it is possible to use a silica-based optical fiber, a halide-based optical fiber, a chalcogenide-based optical fiber, a lanthanum-based optical fiber, an optical crystal of fluoride (e.g., YLF LiYF$_4$), an optical crystal of mixed fluoride, an optical crystal of an oxide (e.g., an optical crystal of Y$_3$Al$_5$O$_{12}$, or the like.

Although each of the first to fourth embodiments has used the light at a wavelength of 1210 nm as the pumping beam for causing the GSA transition and the light at a wavelength of 650 nm as the pumping beam for causing the ESA transition, this is because the fluoride-based optical material has been doped with the Tm ions. In the case where another material is to be doped with the Tm ions, a pumping beam at a wavelength of 1000 to 1300 nm and a pumping beam at a wavelength of 625 to 820 nm can adequately be selected to cause the GSA transition and the ESA transition, respectively.

The first to fourth embodiments have adopted a method in which the pumping beam for causing the GSA transition and the pumping beam for causing the ESA transition are made incident upon the different surfaces of the optical fiber so as to maximize the incident efficiency for the optical fiber. If both of the pumping beams are made incident on one end surface, they exhibit different incident efficiencies depending on chromatic aberration since their wavelengths are greatly different from each other. However, it is not necessarily required to cause the pumping beams to be incident on different end surfaces when a lens with reduced chromatic aberration is used or when no lens is used.

We claim:

1. A short-wavelength laser element doped with rare earth ions comprising:

a first pumping source for outputting a first pumping beam at a wavelength of 1000 to 1300 nm;

a second pumping source for outputting a second pumping beam at a wavelength of 625 to 820 nm;

an optical crystal selected from the group consisting of fluoride, mixed fluoride and an oxide having an incident portion on which said first pumping beam and said second pumping beam are incident and an emitting portion from which a laser beam at a wavelength of 460 to 500 nm is emitted, said optical material being doped with Tm ions at a concentration of 0.001% to 10% which sequentially experience a ground-state absorption transition upon absorption of said first pumping beam, an excited-state absorption transition to an upper laser level upon absorption of said second pumping beam, and a radiative transition from the upper laser level to a ground-state level as to emit light at a wavelength of 460 to 500 nm; and a resonator for resonating the light at a wavelength of 460 to 500 nm emitted from said Tm ions such that the laser beam oscillates.

2. A short-wavelength laser element doped with rare earth ions according to claim 1, wherein the first pumping beam outputted from said first pumping source has a wavelength of 1200 to 1220 nm.

3. A short-wavelength laser element doped with rare earth ions according to claim 1, wherein the second pumping beam outputted from said second pumping source has a wavelength of 625 to 660 nm.

4. A short-wavelength laser element doped with rare earth ions according to claim 1, wherein said optical crystal has a core portion as a high-refraction region and a clad portion as a low-refraction region surrounding said core portion, said core portion being doped with said Tm ions.

5. A short-wavelength laser element doped with rare earth ions according to claim 1, wherein said first pumping source is a Nd:YAG laser element to be excited by a semiconductor laser, a semiconductor laser element, or an optical-fiber laser element doped with Yb or Nd to be excited by a semiconductor laser.

6. A short-wavelength laser element doped with rare earth ions according to claim 1, wherein said second pumping source is a semiconductor laser element.

7. An optical amplifier doped with rare earth ions comprising:

a first pumping source for outputting a first pumping beam at a wavelength of 1000 to 1300 nm;

a second pumping source for outputting a second pumping beam at a wavelength of 625 to 820 nm; and an optical fiber selected from the group consisting of a fluoride-based oxide fiber, a silica-based optical fiber, a halide-based optical fiber, a chalcogenide-based optical fiber and a lanthanum-based optical fiber having an incident portion on which said first pumping beam, said second pumping beam, and signal light at a wavelength of 460 to 500 nm are incident and an emitting portion from which the signal light amplified is emitted, said optical material being doped with Tm ions at a concentration of 0.001% to 10% which sequentially experience a ground-state absorption transition upon absorption of said first pumping beam, an excited-state absorption transition to an upper laser level upon absorption of said second pumping beam, and a radiative transition from the upper laser level to a ground-state level so as to give a gain to the signal light at a wavelength of 460 to 500 nm.

8. An optical amplifier doped with rare earth ions according to claim 7, wherein the first pumping beam outputted from said first pumping source has a wavelength of 1200 to 1220 nm.

9. An optical amplifier doped with rare earth ions according to claim 7, wherein the second pumping beam outputted from said second pumping source has a wavelength of 625 to 660 nm.

10. An optical amplifier doped with rare earth ions according to claim 7, wherein said optical fiber is an optical fiber having a core portion as a high-refraction region and a clad portion as a low-refraction region surrounding said core portion, said core portion being doped with said Tm ions.

11. An optical amplifier doped with rare earth ions according to claim 7, wherein said first pumping source is a Nd:YAG laser element to be excited by a semiconductor laser, a semiconductor laser element, or an optical-fiber laser element doped with Yb or Nd to be excited by a semiconductor laser.

12. An optical amplifier doped with rare earth ions according to claim 7, wherein said second pumping source is a semiconductor laser element.

13. An optical amplifier doped with rare earth ions according to claim 7, wherein the first pumping beam outputted from said first pumping source has a wavelength of 1200 to 1220 nm.

14. An optical amplifier doped with rare earth ions according to claim 7, wherein the second pumping beam outputted from said second pumping source has a wavelength of 625 to 660 nm.

15. An optical amplifier doped with rare earth ions according to claim 7, wherein said optical crystal has a core portion as a high-refraction region and a clad portion as a low-refraction region surrounding said core portion, said core portion being doped with said Tm ions.

16. An optical amplifier doped with rare earth ions according to claim 7, wherein said first pumping source is a Nd:YAG laser element to be excited by a semiconductor laser, a semiconductor laser element, or an optical-fiber laser element doped with Yb or Nd to be excited by a semiconductor laser.

17. An optical amplifier doped with rare earth ions according to claim 7, wherein said second pumping source is a semiconductor laser element.

18. A wavelength converter doped with rare earth ions comprising:

a pumping source for outputting a pumping beam at a wavelength of 625 to 820 nm; and an optical fiber selected from a fluoride-based optical fiber, a silica-based optical fiber, a halide-based optical fiber, a chalcogenide-based optical fiber, and a lanthanum-based optical fiber having an incident portion on which said pumping beam and light to be subjected to wavelength conversion are incident and an emitting portion from which said pumping beam or light at a wavelength of 460 to 500 nm is emitted, said optical material being doped with Tm ions at a concentration of 0.001% to 10% which sequentially experience ground-state absorption transition upon absorption of said light to be subjected to wavelength conversion, an excited-state absorption transition to an upper laser level upon absorption of said pumping beam, and a radiative transition from the upper laser level to a ground-state level so as to emit the light at a wavelength of 460 to 500 nm.

19. A wavelength converter doped with rare earth ions according to claim 18, wherein the pumping beam outputted from said pumping source has a wavelength of 625 to 660 nm.

20. A wavelength converter doped with rare earth ions according to claim 18, further comprising a resonator for resonating the light at a wavelength of 460 to 500 nm emitted from said Tm ions such that a laser beam oscillates.

21. A wavelength converter doped with rare earth ions according to claim 18, wherein said optical fiber is an optical fiber having a core portion as a high-refraction region and a clad portion as a low-refraction region surrounding said core portion, said core portion being doped with said Tm ions.

22. A wavelength converter doped with rare earth ions according to claim 18, wherein said pumping source is a semiconductor laser element.

23. An optical amplifier doped with rare earth ions comprising:

a first pumping source for outputting a first pumping beam at a wavelength of 1000 to 1300 nm;

a second pumping source for outputting a second pumping beam at a wavelength of 625 to 820 nm; and an optical crystal selected from the group consisting of fluoride, mixed fluoride, and an oxide having an incident portion on which said first pumping beam, said second pumping beam, and signal light at a wavelength of 460 to 500 nm are incident and an emitting portion from which the signal light amplified is emitted, said optical material being doped with Tm ions at a concentration of 0.001% to 10% which sequentially experience a ground-state absorption transition upon absorption of said first pumping beam, an excited-state absorption transition to an upper laser level upon absorption of said second pumping beam, and a radiative transition from the upper laser level to a ground-state level so as to give a gain to the signal light at a wavelength of 460 to 500 nm.

* * * * *